United States Patent
Becker et al.

(10) Patent No.: US 11,444,296 B2
(45) Date of Patent: Sep. 13, 2022

(54) MEMBRANE HUMIDIFIER, PREFERABLY FOR A FUEL CELL SYSTEM

(71) Applicant: Bayerische Motoren Werke Aktiengesellschaft, Munich (DE)

(72) Inventors: Marc Becker, Vaterstetten (DE); Thomas Hoefler, Groebenzell (DE); Hubert Wimmer, Isen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 595 days.

(21) Appl. No.: 16/434,667

(22) Filed: Jun. 7, 2019

(65) Prior Publication Data
US 2019/0288306 A1 Sep. 19, 2019

Related U.S. Application Data

(63) Continuation of application No. PCT/EP2017/078484, filed on Nov. 7, 2017.

(30) Foreign Application Priority Data

Dec. 8, 2016 (DE) ..................... 10 2016 224 475.2

(51) Int. Cl.
*H01M 8/04119* (2016.01)
*B01D 63/08* (2006.01)

(52) U.S. Cl.
CPC ...... *H01M 8/04149* (2013.01); *B01D 63/081* (2013.01); *B01D 63/082* (2013.01);
(Continued)

(58) Field of Classification Search
CPC ................. H01M 8/04149; B01D 63/082–085
See application file for complete search history.

(56) References Cited

U.S. PATENT DOCUMENTS

| 3,730,350 A | 5/1973 | Hoeltzenbein |
| 8,091,868 B2 | 1/2012 | Robb et al. |
| 8,919,746 B2 | 12/2014 | Vanderwees et al. |

(Continued)

FOREIGN PATENT DOCUMENTS

| CN | 102076401 A | 5/2011 |
| CN | 201885611 U | 6/2011 |

(Continued)

OTHER PUBLICATIONS

Japanese Office Action issued in Japanese application No. 2019-529597 dated Jul. 26, 2021, with English translation (Seven (7) pages).

(Continued)

*Primary Examiner* — Robert S Carrico
(74) *Attorney, Agent, or Firm* — Crowell & Moring LLP (57) ABSTRACT

A membrane humidifier has multiple stacking units mounted one on top of the other, where an individual stacking unit includes a flow plate and diffusion unit, where a circumference of the diffusion unit is formed by two oppositely situated first edge sides and two oppositely situated second edge sides. The diffusion unit includes: a top layer on a top side of the diffusion unit, a bottom layer on a bottom side of the diffusion unit, a moisture-permeable membrane, two oppositely situated upper receiving elements at the two first edge sides, on the top side of the diffusion unit, and two oppositely situated lower receiving elements at the two second edge sides, on the bottom side of the diffusion unit, where the flow plate of the stacking unit is inserted into the two lower receiving elements, and where the next stacking unit is inserted into the two upper receiving elements.

15 Claims, 12 Drawing Sheets

(52) U.S. Cl.
CPC ..... *H01M 8/04141* (2013.01); *B01D 2313/02* (2013.01); *B01D 2313/025* (2013.01); *H01M 2250/20* (2013.01); *Y02T 90/40* (2013.01)

(56) References Cited

U.S. PATENT DOCUMENTS

| | | | |
|---|---|---|---|
| 2004/0251128 A1* | 12/2004 | Weuta | H01M 8/0273 204/288.2 |
| 2008/0001313 A1 | 1/2008 | Zhang et al. | |
| 2010/0019400 A1 | 1/2010 | Robb et al. | |
| 2010/0122461 A1 | 5/2010 | Minas et al. | |
| 2015/0380751 A1* | 12/2015 | Fasold | H01M 8/04149 261/105 |
| 2017/0084936 A1* | 3/2017 | Amirnasr | B01F 23/20 |

FOREIGN PATENT DOCUMENTS

| | | |
|---|---|---|
| DE | 10 2009 034 095 A1 | 3/2010 |
| DE | 10 2012 218 303 A1 | 4/2013 |
| DE | 11 2012 000 477 T5 | 10/2013 |
| DE | 10 2014 009 329 A1 | 12/2015 |
| JP | 2004-139784 A | 5/2004 |
| JP | 2008-21645 A | 1/2008 |
| KR | 10-2004-0080777 A | 9/2004 |
| WO | WO 2009/158030 A1 | 12/2009 |
| WO | WO 2015/118144 A1 | 8/2015 |

OTHER PUBLICATIONS

Chinese Office Action issued in Chinese application No. 201780073781.9 dated Mar. 31, 2021, with English translation (Sixteen (16) pages).

PCT/EP2017/078484, International Search Report dated Feb. 5, 2018 (Three (3) pages).

German Search Report issued in German counterpart application No. 10 2016 224 475.2 dated Jun. 30, 2017, with Statement of Relevancy (Six (6) pages).

* cited by examiner

MEMBRANE HUMIDIFIER, PREFERABLY FOR A FUEL CELL SYSTEM

CROSS REFERENCE TO RELATED APPLICATIONS

This application is a continuation of PCT International Application No. PCT/EP2017/078484, filed Nov. 7, 2017, which claims priority under 35 U.S.C. § 119 from German Patent Application No. 10 2016 224 475.2, filed Dec. 8, 2016, the entire disclosures of which are herein expressly incorporated by reference.

BACKGROUND AND SUMMARY OF THE INVENTION

The here disclosed technology relates to a membrane humidifier which is preferably used in a fuel cell system.

Membrane humidifiers are used in fuel cell systems in particular to humidify the relatively dry cathode feed air with the relative moist cathode exhaust air. Within the membrane humidifier, the moisture of the cathode exhaust air is transmitted through a moisture-permeable membrane to the dry cathode feed air.

In particular, the membrane humidifiers are employed for fuel cells with proton exchange membrane (PEM). In order to be able to operate such a fuel cell at maximum possible output, in particular an operating temperature of 80 to 95° is advantageous. The high operating temperature here enables, for instance, a better heat removal via the coolant than at lower operating temperature. Since the proton exchange membranes, on the one hand due to the high temperature and on the other hand as a result of the high air mass flow necessary for the high output, dry out more strongly than at low temperatures, the humidification of the cathode feed air is advantageous. Without humidification, the efficiency of the fuel cell would fall. An exemplary membrane humidifier is shown by US 2008/0001313 A1.

A preferred object of the here disclosed technology is at least to reduce, or to remedy, a drawback of the previously known solutions.

In particular, it is an object of the here disclosed technology to define a membrane humidifier which, with a simple and inexpensive structure, can be used in an operationally reliable manner with low maintenance. The membrane humidifier should in particular in a fuel cell system be suitable for humidifying the cathode feed air of the fuel cell with the cathode exhaust air from the fuel cell. Further preferred objects can emerge from the advantageous effects of the here disclosed technology.

The here disclosed technology relates inter alia to a fuel cell system comprising at least one fuel cell. The fuel system is envisioned, for instance, for mobile applications such as motor vehicles, in particular for providing the energy for at least one driving engine for the locomotion of the motor vehicle. In its simplest form, a fuel cell is an electrochemical energy converter, which converts fuel and oxidant into reaction products and hereupon produce electricity and heat. The fuel cell comprises an anode and a cathode, which are separated by an ion-selective or ion-permeable separator. The anode is supplied with fuel. Preferred fuels are: hydrogen, low-molecular alcohol, biofuels, or liquefied natural gas. The cathode is supplied with oxidant. Preferred oxidants are, for instance: air, oxygen and peroxides. The ion-selective separator can be configured, for instance, as a proton exchange membrane (PEM). Preferably, a cation-selective polymer electrolyte membrane is employed. Materials for such a membrane are, for instance: Nafion®, Flemion® and Aciplex®.

A fuel cell system comprises, besides the at least one fuel cell, peripheral system components (BOP components), such as, for instance, a membrane humidifier which can be employed in the operation of the at least one fuel cell. Generally, a plurality of fuel cells can be combined to form a stack or fuel cell stack.

The object is achieved by a membrane humidifier which is preferably used for a fuel cell system. However, it is also possible to use the membrane humidifier for other systems, for instance for the moisture exchange in the ventilation of a house.

The membrane humidifier comprises a plurality of stacking units placed one on top of another. A multiplicity of stacking units can here be placed one on top of another along a stacking axis. The stacking units lie perpendicular to the stacking axis. For use in a fuel cell system, for instance, 50 or more stacking units can be put together to form a membrane humidifier. The individual stacking units are preferably all structurally identical, though the first and last stacking unit can also be designed differently.

The individual stacking unit is composed of a flow plate and a diffusion unit. In the flow plate, a plurality of flow channels are arranged side by side. The flow channels can be structured or interrupted in order to be able to perform a purposeful influencing of the flow. In the use of the membrane humidifier, the moist gas and the gas to be humidified are conducted through these flow channels. The flow channels are respectively open toward the diffusion unit of the same stacking unit, or toward the diffusion unit of the next stacking unit, so that the moisture can pass through the adjoining diffusion unit into the flow channels of the nearest flow plate.

A periphery of the individual diffusion unit is here, by definition, formed by two opposing first marginal sides and two opposing second marginal sides. This periphery of the diffusion unit is preferably rectangular, particularly preferably square.

The individual diffusion unit comprises a top layer and a bottom layer. Merely for the simple and clear description of the here disclosed technology, the terms "at the top, top layer, top side" and "at the bottom, bottom layer, bottom side" are used. Of course, "at the top" and "at the bottom" can also be interchanged, or the membrane humidifier can be used in such a way that the diffusion units and the flow plates stand upright.

The individual diffusion unit further comprises at least one diffusion layer, preferably an upper diffusion layer and a lower diffusion layer. In addition, the individual diffusion unit comprises a moisture-permeable membrane. Where two diffusion layers are used, the membrane is located between the two diffusion layers. If only one diffusion layer is used, then the membrane bears against the one diffusion layer. In particular, the membrane is in contact with the at least one diffusion layer.

In a preferred embodiment, it is provided that the top layer of the diffusion unit comprises the upper diffusion layer. The bottom layer of the diffusion unit comprises the lower diffusion layer. The membrane can be assigned either to the top layer or to the bottom layer.

If only one diffusion layer is used, then this diffusion layer forms either the top layer or the bottom layer. Accordingly, the membrane then forms the other layer, that is to say either the bottom layer or the top layer.

The membrane is in particular configured such that between the two gas streams, with the exception of the moisture, as far as possible no exchange of media takes place. The at least one diffusion layer is in particular media-permeable and serves primarily for the secure reception and positioning of the membrane. The two diffusion layers can here be designed differently, in particular in terms of material and thickness.

Furthermore, the individual diffusion unit has two opposing upper receiving elements. The two upper receiving elements are located on the two first marginal sides. In addition, the diffusion unit has two opposing lower receiving elements. The two lower receiving elements are located on the two second marginal sides. Purely for the sake of clarity, the receiving elements are referred to as "upper receiving elements" and "lower receiving elements" in accordance with the top side and the bottom side of the diffusion unit. What is important is that the one receiving elements on the first marginal sides are located on one side, and the other receiving elements on the second marginal sides are located on the other side.

The flow plate of the one stacking unit is inserted in the two or between the two lower receiving units. In the two or between the two upper receiving units is inserted the next stacking unit.

The use of the receiving elements in the diffusion unit enables a simple connection to the respective flow plate and to the nearest stacking unit. In the regions of the upper receiving elements, in particular a gluing of the individual elements of the membrane humidifier is here dispensed with. The lower receiving elements receive the flow plate. In an advantageous embodiment, the flow plate is fastened in an integrally bonded manner, in particular by gluing or welding, in the lower receiving elements.

Within the framework of the present technology, two variants to the design of the receiving elements are described. Thus the receiving elements can preferably be formed either by shaping, in particular folding, of the top layer and bottom layer respectively, or by joining of the frame element, in particular made of plastic, preferably sealing material. In both variants, a, in certain regions, sealtight stacking of the individual elements is produced.

The individual receiving element is preferably realized either as a groove or in angular form. The groove is here open in the direction perpendicular to the stacking axis and thus forms, in a plane perpendicular to the stacking axis, an open slot. The angular design of the receiving element is preferably formed by a side face and a bearing surface angled-off therefrom. The bearing surface extends in particular perpendicular, and the side face parallel to the stacking axis.

As already described, the upper receiving elements form a receptacle for the next, top-disposed stacking unit, and the lower receiving elements form a receptacle for the flow plate of the same stacking unit. The two opposing upper receiving elements of a stacking unit can be designed differently: thus it is also provided that, for instance, on one of the two marginal sides, the upper receiving element is configured as a groove and, on the other first marginal side, the upper receiving element is of angular design. It is further provided that, for instance, on one of the two marginal sides, the lower receiving element is configured as a groove and, on the other second marginal side, the lower receiving element is of angular design. Thus the here described embodiments of the receiving element can also be mutually combined within a stacking unit.

In a preferred embodiment, it is provided that at least one of the upper grooves is a groove. Preferably the two upper receiving elements are configured as a groove and are open toward one another.

In a preferred embodiment, it is provided that at least one of the upper grooves is formed by folded-over margins of the bottom layer, preferably of the lower diffusion layer. For the formation of the groove, the bottom layer is preferably bent over twice, in particular by about 90°.

If the bottom layer is formed merely by the membrane, then the membrane is folded over for the formation of the upper groove. If the bottom layer is formed by the lower diffusion layer and the membrane, then the lower diffusion layer and/or the membrane is folded over. Furthermore, it is always also possible, in addition to the bottom layer, also to fold the top layer in the same direction, so that the groove is formed by the top layer and the bottom layer.

As a result of the design of the at least one upper receiving element as an upper groove, this upper groove preferably embraces the margin of the top layer, in particular of the membrane and of the upper diffusion layer, of the same stacking unit, and the complete next stacking unit, which is arranged on the top layer.

In a preferred embodiment, it is provided that at least one of the two lower receiving elements is a groove. Preferably, the two lower receiving elements are configured as a groove and are open toward one another.

In a preferred embodiment, it is provided that at least one of the lower grooves is formed by folded-over margins of the top layer. For the formation of the groove, the top layer is preferably bent over twice, in particular by about 90°.

If the top layer is formed merely by the membrane, then the membrane is folded over for the formation of the lower groove. If the top layer is formed by the upper diffusion layer and the membrane, then the upper diffusion layer and/or the membrane is folded over. Furthermore, it is always also possible, in addition to the top layer, also to fold the bottom layer in the same direction, so that the groove is formed by the bottom layer and the top layer.

As a result of the design of the at least one lower receiving element as a lower groove, this lower groove preferably embraces the margin of the flow plate, in particular also the membrane and the lower diffusion layer, of the same stacking unit.

Also the design of the angular receiving elements can be realized by shaping of the margins of the top layer and bottom layer respectively.

The diffusion layers are preferably produced from thermoplastic nonwoven fabric. This material is suitable, in particular, for the design of the grooves or of the angular receiving elements by shaping. In particular, the thermoplastic nonwoven fabric is heated for the configuration of the receiving elements, in order to enable an easier shaping. It is also provided, however, to use a diffusion layer of another porous, in particular thermoplastic, material.

The shaped margins of the at least one diffusion layer or of the membrane are preferably of structured design, in particular by means of a circumferential bead, in order to compensate height differences resulting from the height of the flow plates, the material thickness of the flow plates, and diffusion layers, as well as tolerances.

The same purpose is met by a preferred structuring of the sealing margins of the flow plate, for instance likewise by a circumferential bead.

As already described, at least one of the two upper receiving elements is angular and thus forms a side face and a bearing surface angled-off therefrom, preferably by 90°, for the next, above-disposed stacking unit. Furthermore, preferably at least one of the two lower receiving elements is angular and thus forms a side face and a bearing surface angled-off therefrom, preferably by 90°, for at least the flow plate of the same stacking unit.

Alternatively to the design of the receiving element by shaping of the top layer or bottom layer, it is preferably provided that at least one of the receiving elements is formed by a frame element. The frame element is joined to the top layer and/or bottom layer. Preferably, the frame element is injection molded. Alternatively, the frame element can, for instance, also be glued on. The frame element is joined, in particular, to at least one diffusion layer, yet can also additionally be joined to the membrane and/or the other diffusion layer. The frame element comprises at least one U-shaped portion, which constitutes the corresponding groove, and/or an angular portion.

It is also provided to combine the two variants, namely the joining of a frame element and the shaping of margins of the top layer and bottom layer respectively, so that, in a membrane humidifier, differently produced receiving elements are used.

Particularly preferably, it is provided that the attached frame element extends fully over all four sides of the individual diffusion unit, in particular the at least one diffusion unit and the membrane, and here forms the two upper receiving elements on the two first marginal sides and the two lower receiving elements on the two second marginal sides.

Irrespective of the variants for the production and design of the receiving elements, it is preferably provided that the two upper receiving elements and/or the two lower receiving elements extend over the entire length of the first marginal side and of the second marginal side respectively. As a result, the diffusion unit is fully surrounded, namely on both first marginal sides and on both second marginal sides, by the receiving elements. Only the corners remain open, at least at a gap, and must possibly be separately sealed.

The flow plates have preferably a corrugated profile. This corrugated profile forms a plurality of parallel flow channels, which are alternately open in the upward and downward direction. Preferably, the flow plates are produced by shaping of a metal sheet, or hot shaping or extrusion or roll calendering of a thermoplastic.

Furthermore, it is preferably provided to configure the flow plate, instead of with corrugated profile, in web form, so that the flow channels are constituted by the grooves configured between the webs.

The individual flow plate has preferably two opposing margin regions. At the margin regions, sealing margins are preferably found. These sealing margins are inserted into both opposing lower receiving elements. In particular, the sealing margins are formed by an applied elastomer or of the same material as the flow plate. It is also possible to dispense of the sealing margins, so that the receiving elements directly receive the margin of the flow plate.

Preferably, the flow plates of adjacent stacking units are arranged offset by 90°, so that a cross-flow principle between the two gas streams, in particular cathode feed air and cathode exhaust air, can be used.

The membrane humidifier preferably comprises a housing for receiving the stacking units placed one on top of another. In the housing, manifolds are arranged or configured as integral component parts of the housing. The manifolds serve to supply and evacuate the two gas streams to the individual flow channels. These manifolds are in particular separate components, not joined to the stacking units.

The here disclosed technology further comprises a fuel cell system, preferably in a vehicle, comprising at least one fuel cell and at least one already described membrane humidifier. The membrane humidifier is here used to humidify a cathode feed air of the fuel cell with a cathode exhaust air of the fuel cell. The advantageous designs described within the framework of the membrane humidifier according to the invention can be applied equally advantageously to the fuel cell system.

The here disclosed technology further comprises a method for producing a membrane humidifier. In particular, this is the membrane humidifier already described. Within the framework the method, at least the following steps are provided.

Firstly, the diffusion unit is assembled from the top layer, the bottom layer and the moisture-permeable membrane arranged between the two layers or in the layers. Before and/or during and/or after the assembly, the two upper receiving elements are configured on the two first marginal sides, and the two lower receiving elements on the two second marginal sides.

The finished stacking unit is formed by insertion of the flow plates into the two lower receiving elements of the diffusion unit. This insertion of the flow plates is realized, in particular, only after the formation of the lower receiving elements of the diffusion unit.

A plurality of the stacking units are correspondingly placed one on top of another, wherein into the two upper receiving elements of the one stacking unit is respectively inserted the next stacking unit.

As already described, the individual receiving element is produced either by shaping of the diffusion layers or by joining of a frame element. The material forming the receiving element is here preferably appropriately thin and flexible, so that it can be readily bent up, preferably elastically, in the assembly of the membrane humidifier.

The finished stack of a plurality of stacking units is preferably inserted into a housing and sealed.

For the integration into the housing, seals can be provided in the corners of the housing and/or in the region of the edges of the assembled stacking units in order to seal the inflow and outflow regions of the duel cell feed air (cathode feed air) and of the fuel cell exhaust air (cathode exhaust air) respectively, one against the other.

The here disclosed technology is now explained with reference to the figures.

Other objects, advantages and novel features of the present invention will become apparent from the following detailed description of one or more preferred embodiments when considered in conjunction with the accompanying drawings.

DETAILED DESCRIPTION OF THE DRAWINGS

The figures show the schematic structure of a membrane humidifier 1. The membrane humidifier 1 is composed of a plurality of stacked stacking units 2. The stacking units 2 are surrounded by a housing (not represented) of the membrane humidifier 1.

Figure 1:
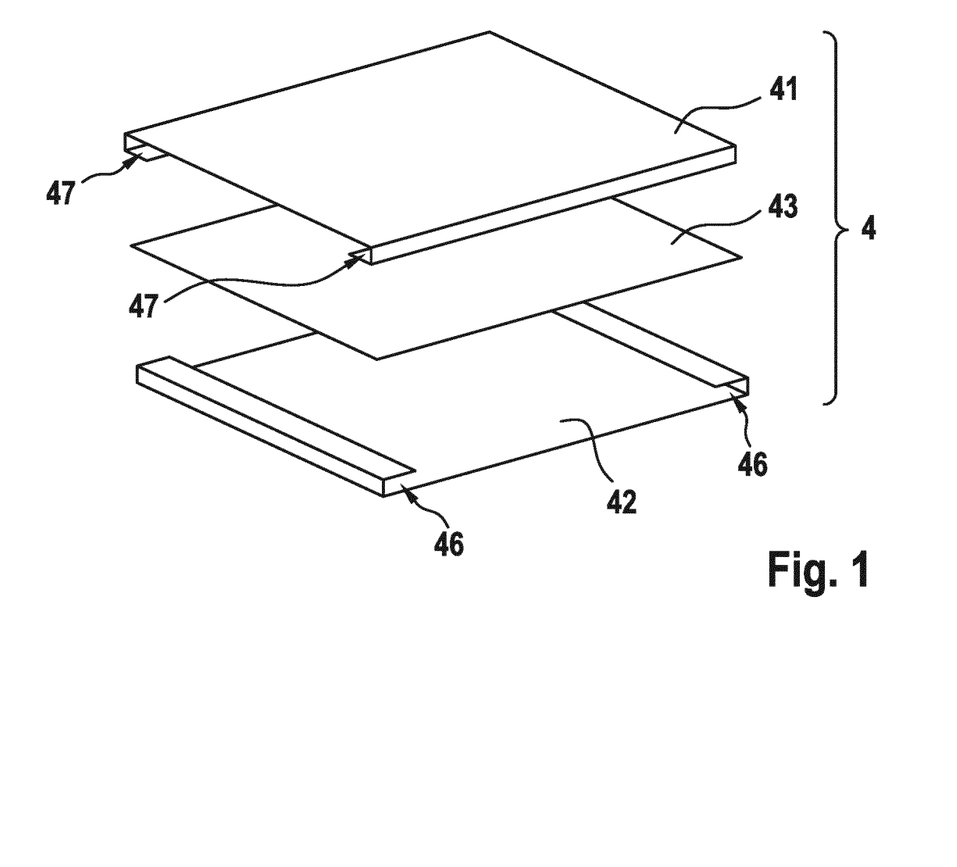
FIGS. 1 to 6 show a schematic structure of the disclosed membrane humidifier according to a first variant.
Figure 2:
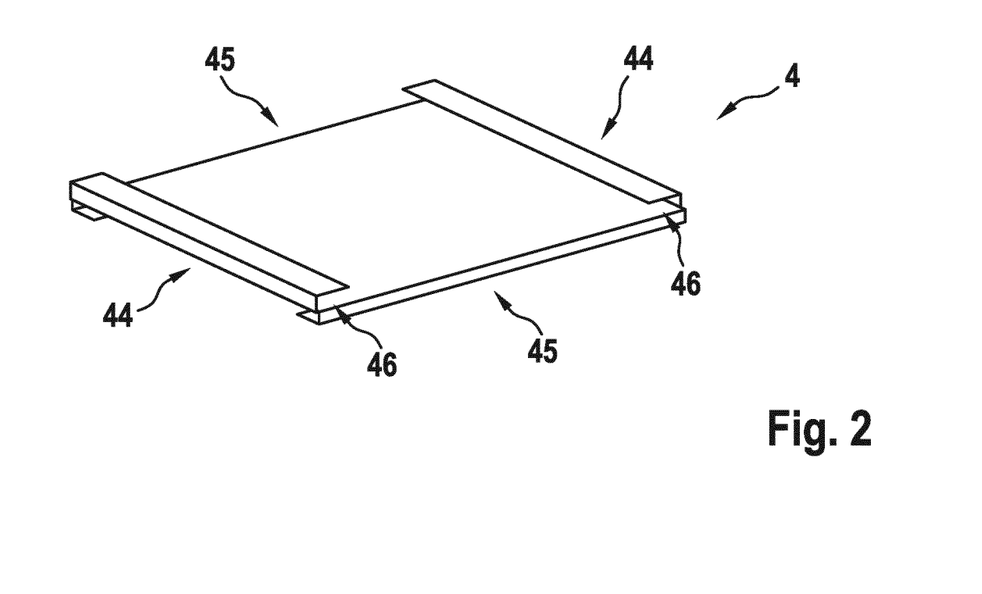

The individual stacking unit 2 comprises a diffusion unit 4. FIG. 1 shows an exploded representation of the diffusion unit 4. The diffusion unit 4 comprises a top layer 41, here formed by an upper diffusion layer, a bottom layer 42, here formed by a lower diffusion layer, and a moisture-permeable membrane 43 between top layer and bottom layer 41, 42. FIG. 2 shows the assembled diffusion unit 4.

On the diffusion unit 4 are defined two opposing first marginal sides 44 and two opposing second marginal sides 45. These four marginal sides 44, 45 form the rectangular periphery of the diffusion unit 4.

On the top side, the diffusion unit 4 has on the two first marginal sides 44 two upper receiving elements 46, here configured as two upper grooves. On the bottom side, the diffusion unit 4 has on the two second marginal sides 45 two lower receiving elements 47, here configured as two lower grooves. The receiving elements 46, 47 configured as grooves lie respectively opposite one another and are open toward one another.

In the first variant according to FIGS. 1 to 10, the upper receiving elements 46 are formed by shaping, in particular folding over, of the lower diffusion layer (bottom layer 42). The lower receiving elements 47 are formed by shaping, in particular folding over, of the upper diffusion layer (top layer 41).

Figure 3:
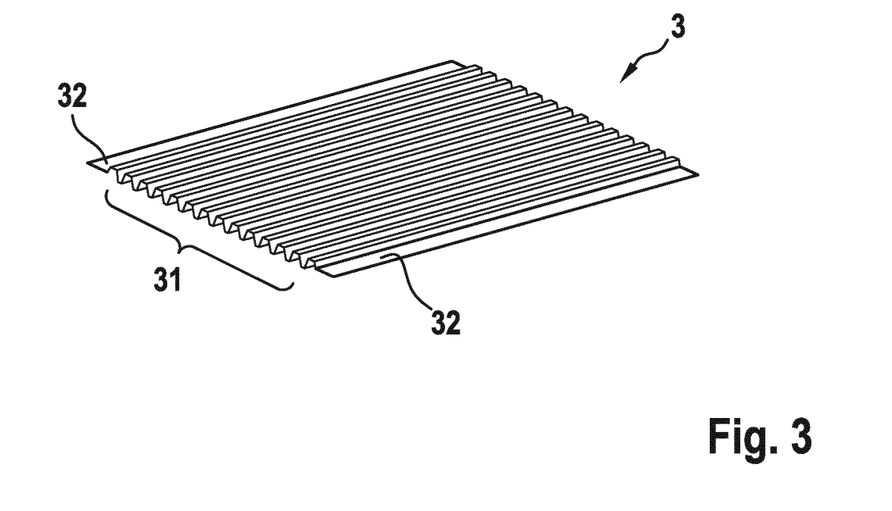
Figure 4:
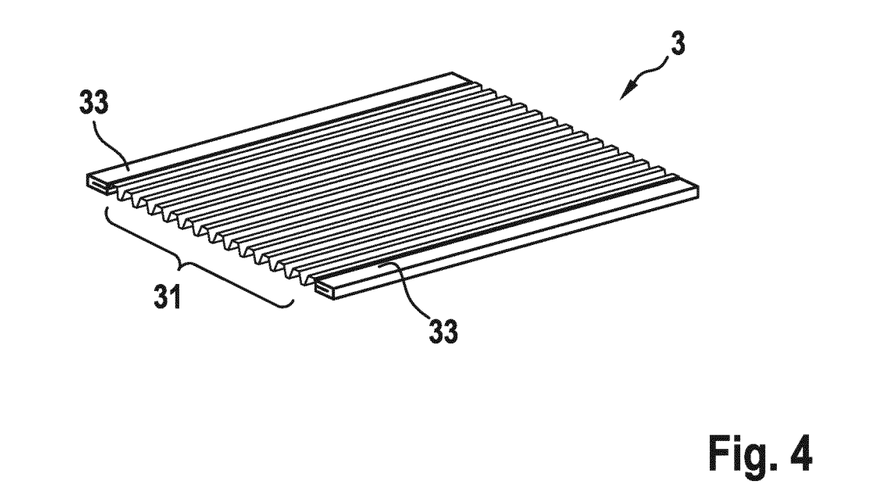

FIG. 3 shows a flow plate 3 of the stacking unit 2. The flow plate 3 has a corrugated profile 31 for the formation of a multiplicity of flow channels 34. On two opposing margin regions 32 of the flow plate 3 are located, according to FIG. 4, sealing margins 33.

Figure 5:
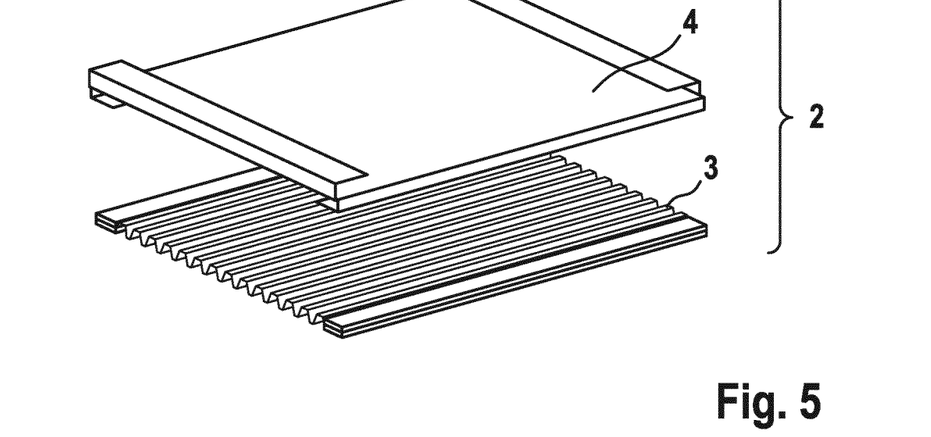
Figure 6:
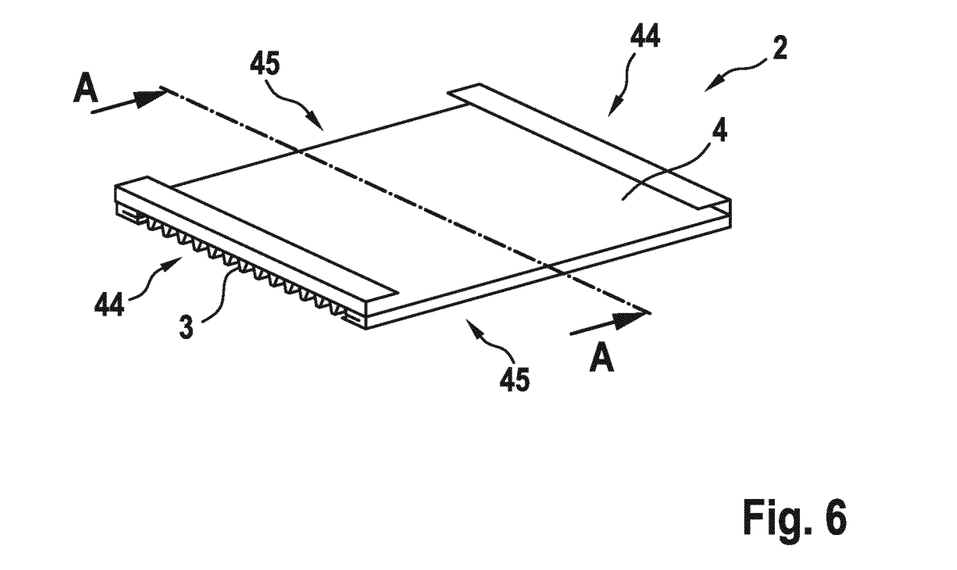

FIG. 5 shows an exploded representation of the stacking unit 2. FIG. 6 shows the assembled stacking unit 2. It can here be seen that the flow plate 3 is arranged with its sealing margins 33 in the lower receiving elements 47. FIGS. 7a-g illustrate the section A:A marked in FIG. 6.

FIGS. 7a-g show different possibilities for the design of the receiving elements 46, 47 as a groove, respectively by shaping of the top layer 41 and bottom layer 42 respectively.

Figure 7A:
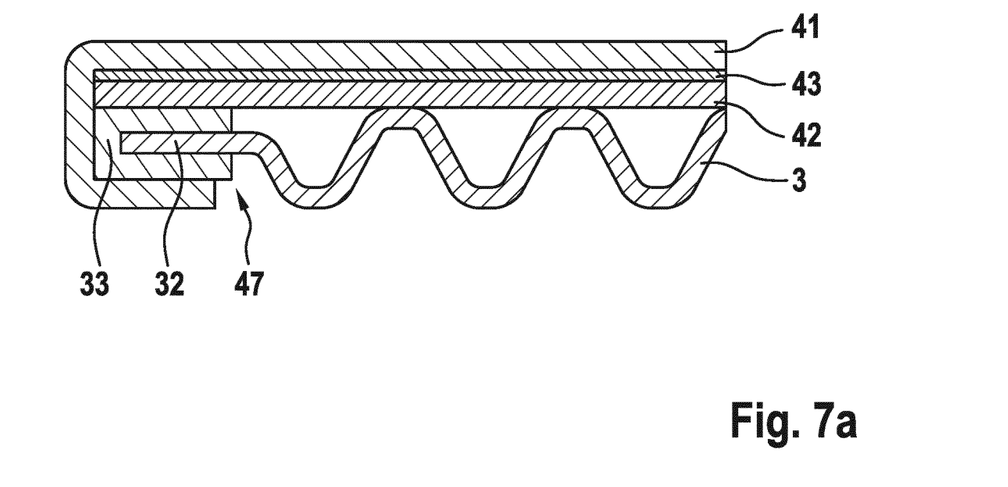
FIGS. 7a-g show various embodiments of the receiving elements.

In FIG. 7a, the lower receiving element 47 is formed by shaping of the top layer 41, here the upper diffusion layer. To this effect, the top layer 41 is folded over twice by 90°. The resulting groove receives the membrane 43, the bottom layer 42 and the margin region 32 of the flow plate 3, here provided with a sealing margin 33.

Figure 7B:
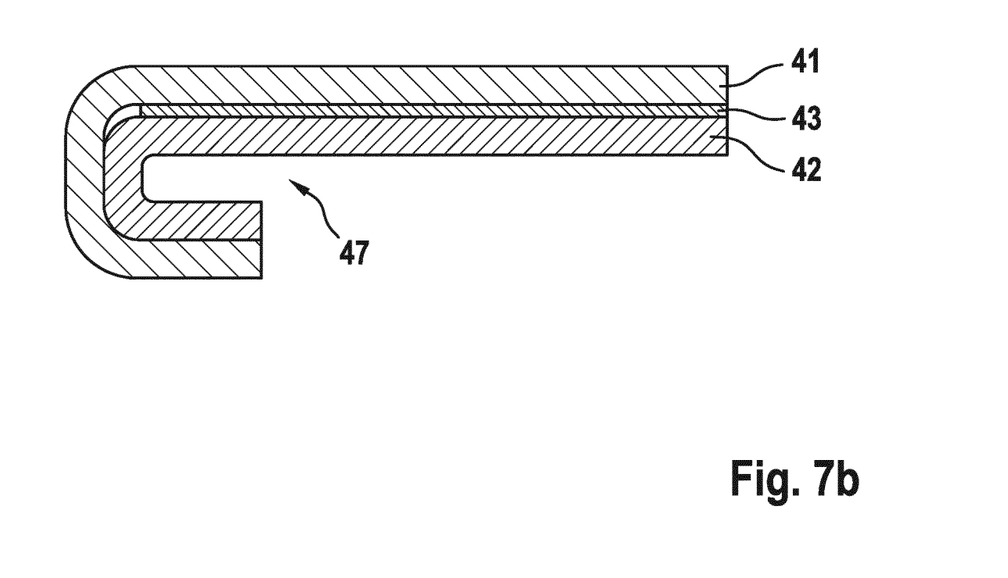

In FIG. 7b, the flow plate 3, for the sake of clarity, is not shown. The formation of the lower receiving element 47 as a groove can here be seen. The bottom layer 42 is shaped, in particular folded over, together with the top layer 41.

Figure 7C:
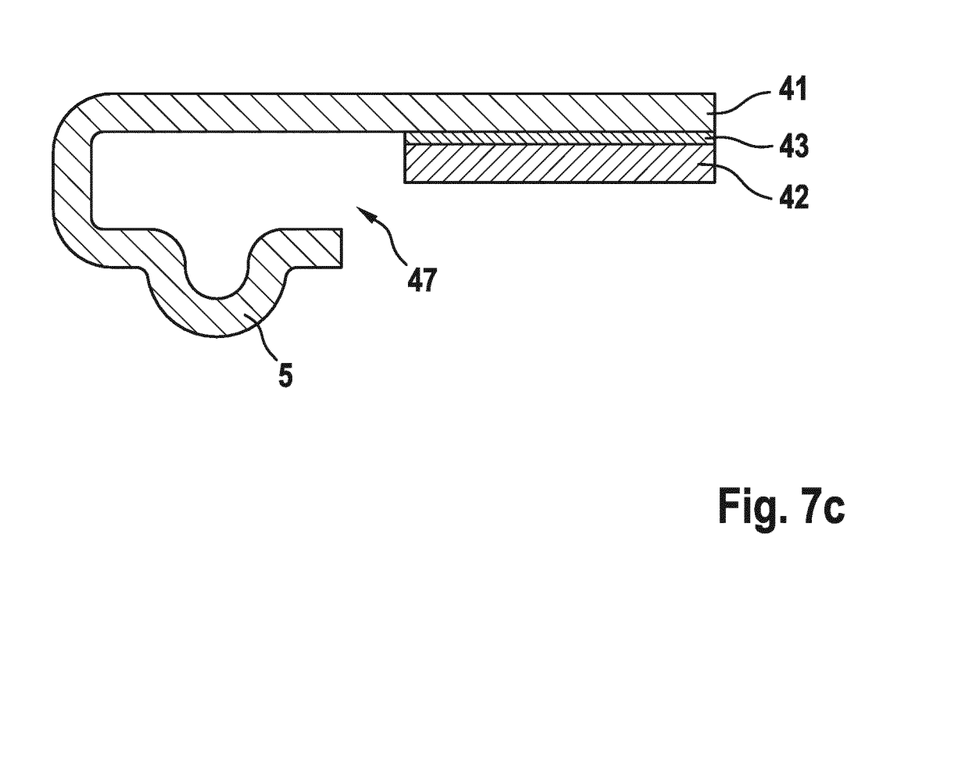

In FIG. 7c, the flow plate 3, for the sake of clarity, is likewise not shown. FIG. 7c shows the possibility of structuring a receiving element, here the lower receiving element 47. This structuring is realized in the shown example by a bead 5. The structuring enables a compensation of height differences and tolerances.

Figure 7D:
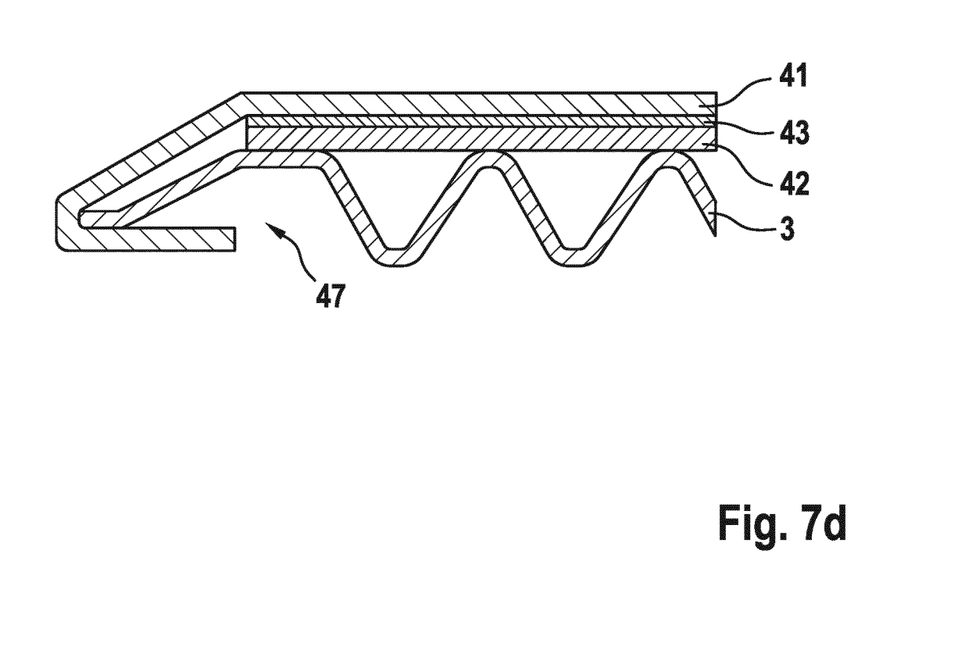

In FIG. 7d, the lower receiving element 47 is formed by shaping of the top layer 41, here the upper diffusion layer. With reference to this figure, it can be seen that the groove can be realized not necessarily in rectangular, but also in triangular configuration. In addition, FIG. 7d shows the accommodation of the flow plate 3 in the lower receiving element 47, without a sealing margin 33 on the flow plate 3.

Figure 7E:
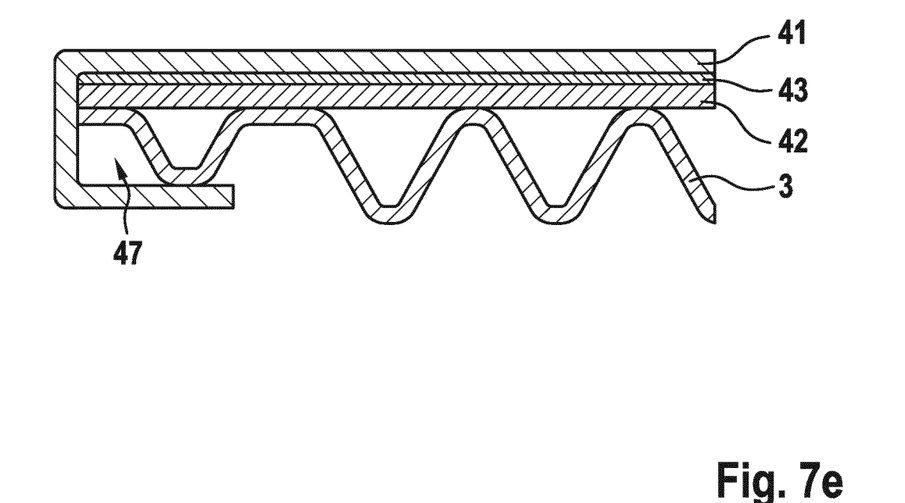

In FIG. 7e, the lower receiving element 47 is formed exactly as in FIG. 7a. However, the flow plate 3 is here seated not with a sealing frame 33, but directly in the groove. The groove is configured with such a height that a structured portion of the flow plate 3, and not just the margin region 32, is accommodated in the groove.

FIGS. 7a to 7e show respectively the design of the lower receiving element 47. However, the upper receiving element 46 can also be of same or similar design. By way of example, FIGS. 7f and 7g also show the design of the upper receiving element 46, respectively on a further, bottom-disposed stacking unit 2.

Figure 7F:
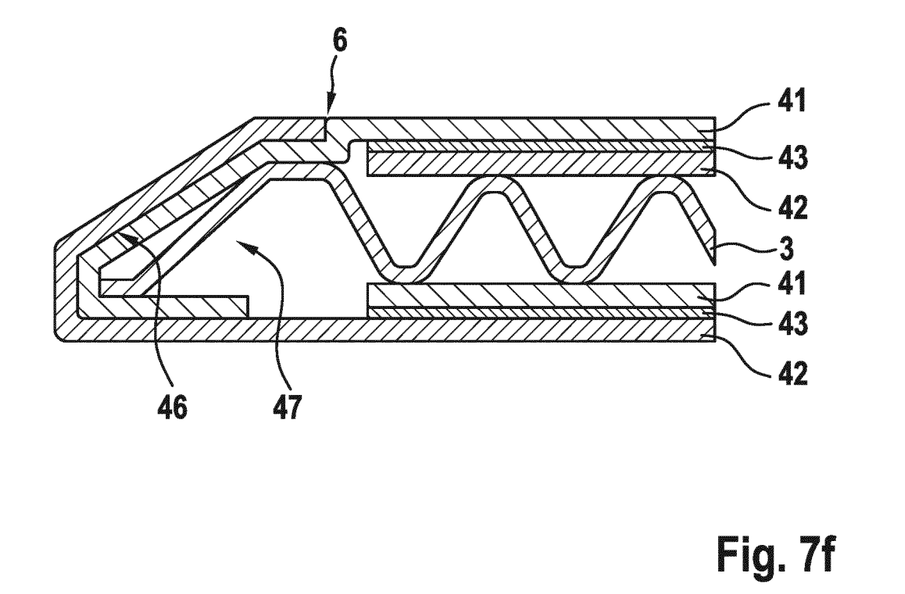

FIG. 7f shows a recess, formed by an offset on the top side of the top layer 41. An upper end of a bottom layer 42 of a bottom-disposed stacking unit 2 lies in this recess 6, so that this upper end and the top layer 41 of the upper stacking unit 2 form a flat surface.

Figure 7G:
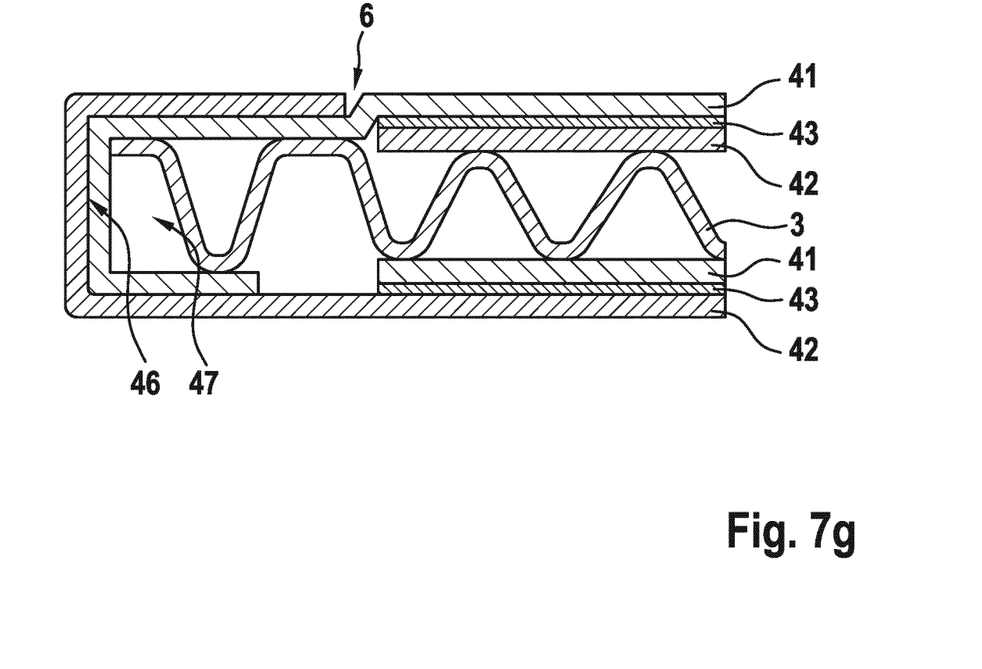

FIG. 7g likewise shows the recess 6 for receiving the upper end of a bottom layer 42. As is shown by FIGS. 7f and 7g, the recess 6 can be used irrespective of the shape of the groove.

Figure 8:
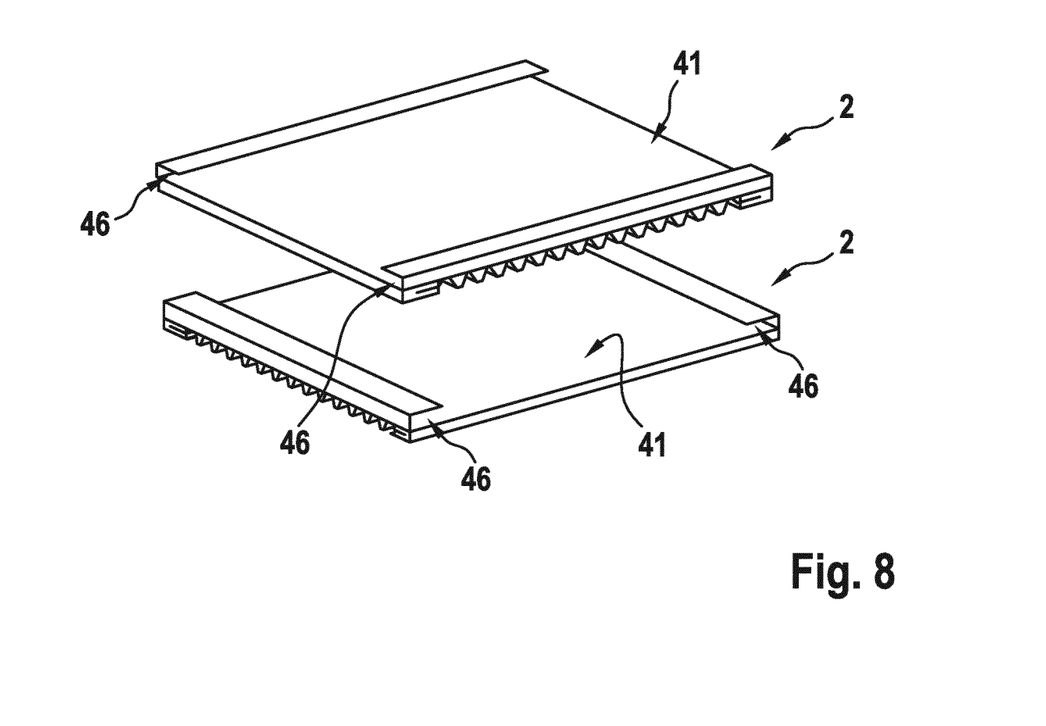
FIGS. 8 to 10 show further views of the schematic structure of the disclosed membrane humidifier according to the first variant.
Figure 9:
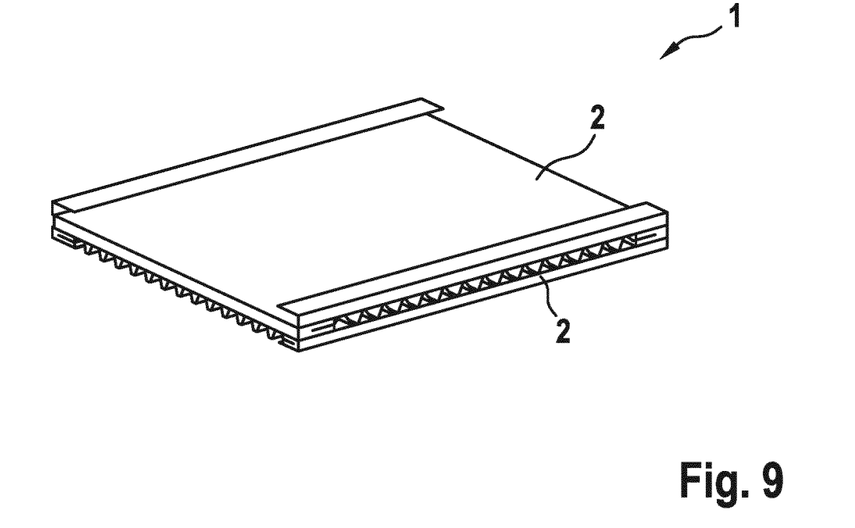

FIG. 8 illustrates in an exploded representation that the finished stacking units 2 are placed one above another. As is shown by FIG. 9, the upper receiving elements 46 receive the next, top stacking unit 2.

Figure 10:
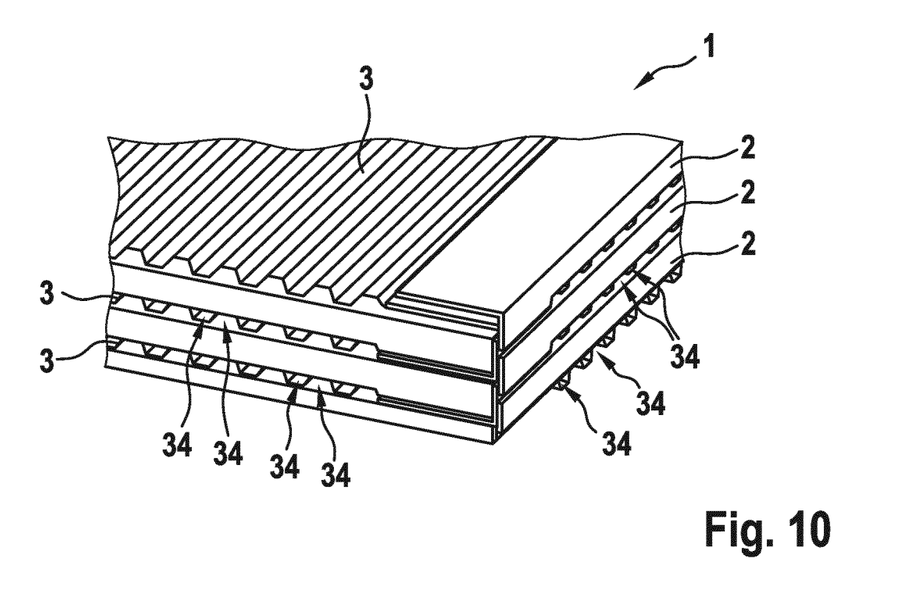

FIG. 10 shows in detail three stacking units 2 stacked one above another.

FIGS. 11 to 16 show a variant of the membrane humidifier 1, in which the receiving elements 46, 47 are not formed by folding over of the top layer or bottom layer 41, 42, but by a frame element 48.

Figure 11:
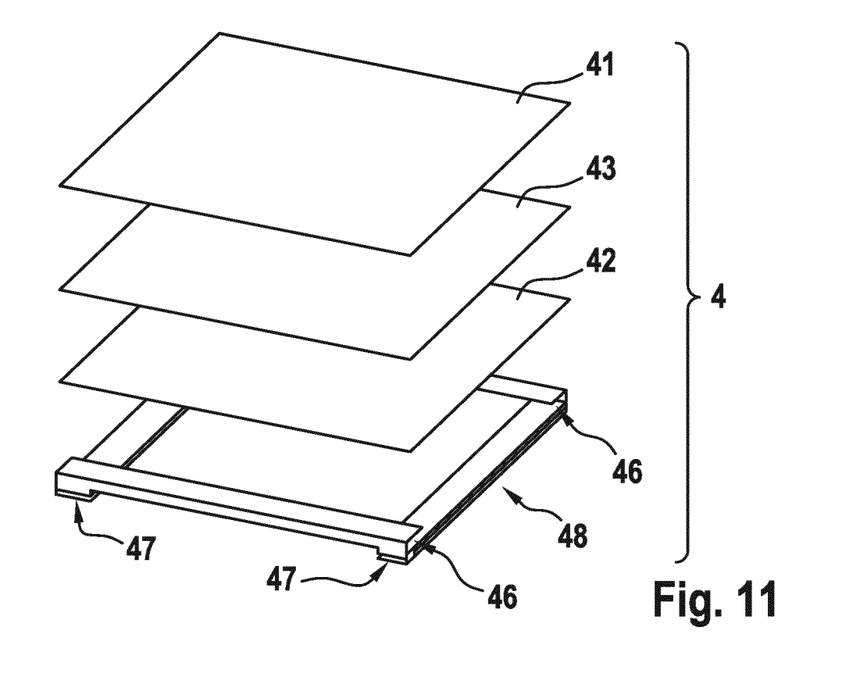
FIGS. 11 to 16 show a schematic structure of the disclosed membrane humidifier according to a second variant.
Figure 12:
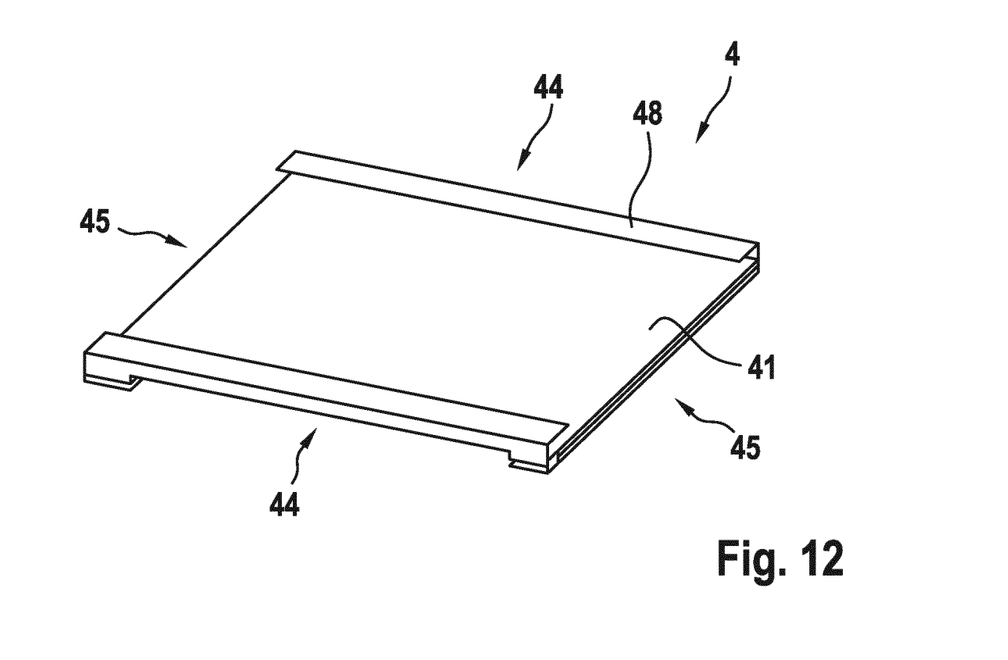

FIG. 11 here shows the diffusion unit 4 as an exploded representation. FIG. 12 shows the finished diffusion unit 4.

The frame element 48 extends fully along the two first marginal sides 44 and the two second marginal sides 45. On the top side, the margin element 48 forms the two opposing upper grooves. On the bottom side, the margin element 48 forms the two lower grooves.

The margin element 48 is joined, preferably injection molded, to at least the top layer and/or bottom layer 41, 42.

Figure 13:
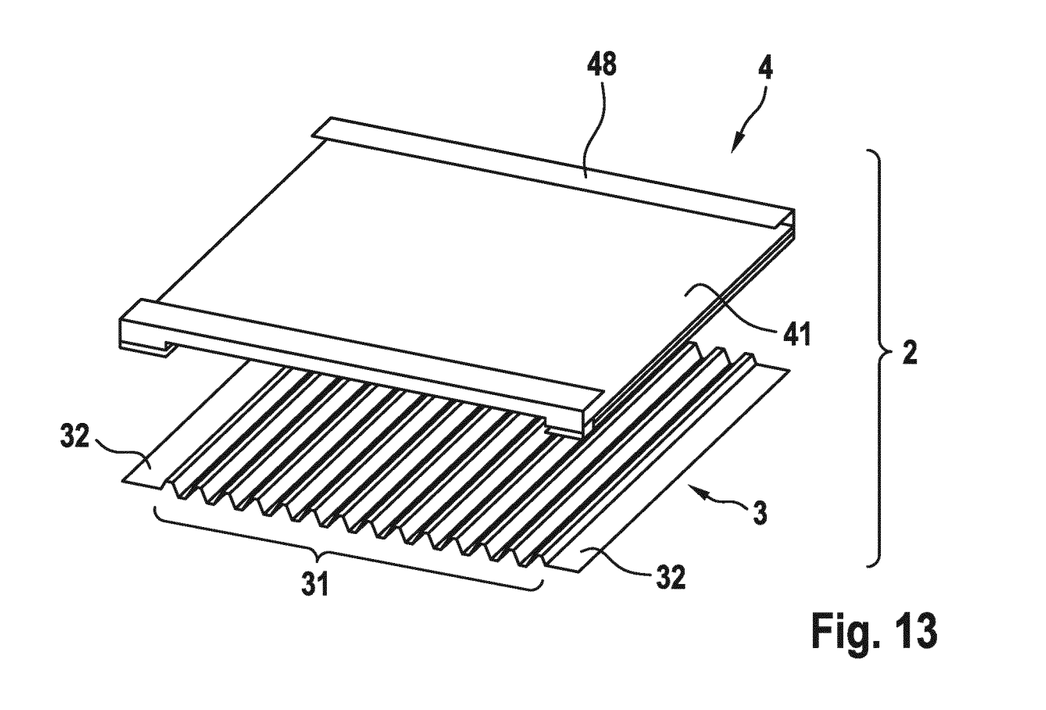
Figure 14:
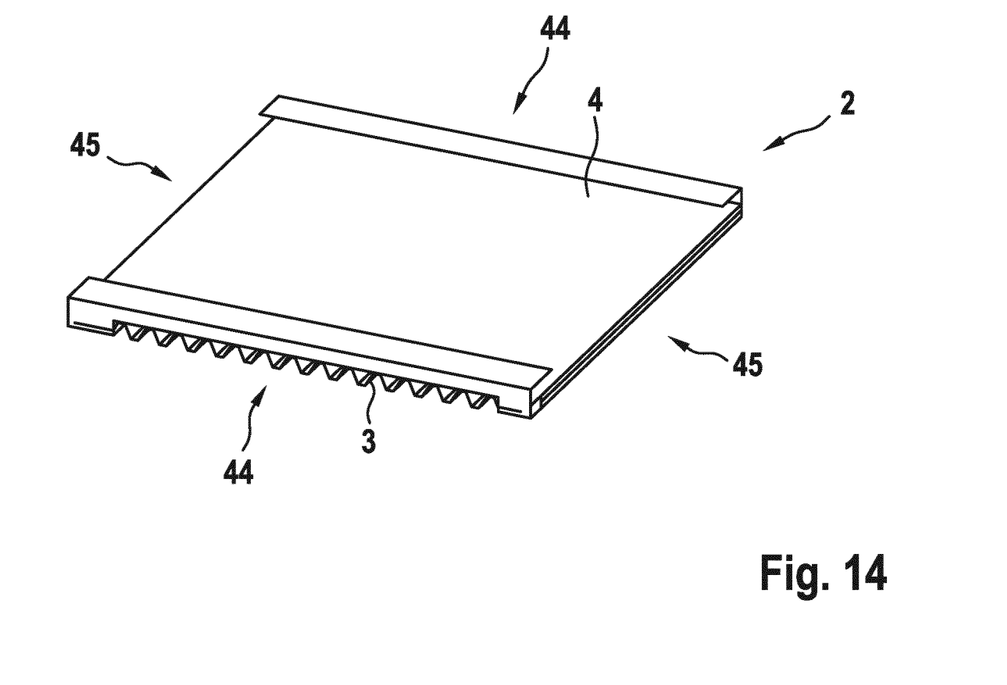

FIGS. 13 and 14 show that the flow plate 3 is inserted into the two lower grooves. In this variant, the two lower grooves are produced very narrow and can receive the flow plate 3 without sealing margins 33 in a sealtight manner.

Figure 15:
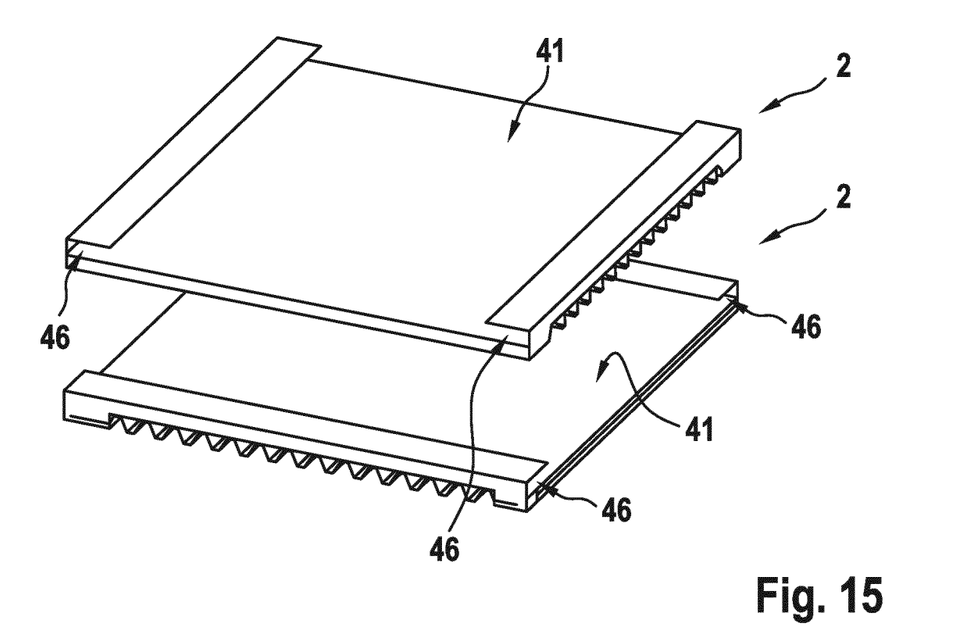
Figure 16:
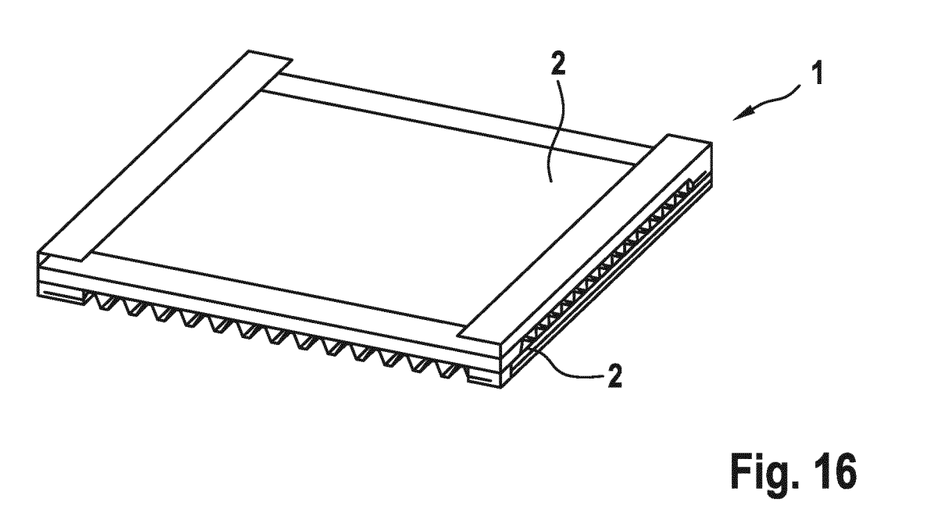

FIGS. 15 and 16 show, analogously to FIGS. 8 and 9, the assembly of a plurality of stacking units 2.

Figure 17A:
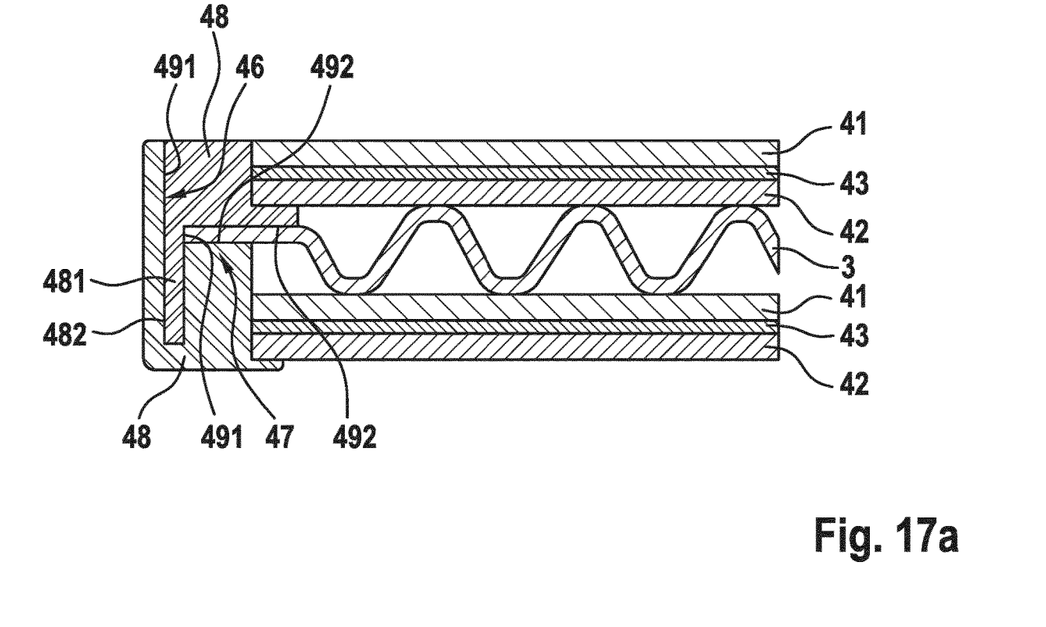
FIGS. 17a-b show various embodiments of the receiving elements.
Figure 17B:
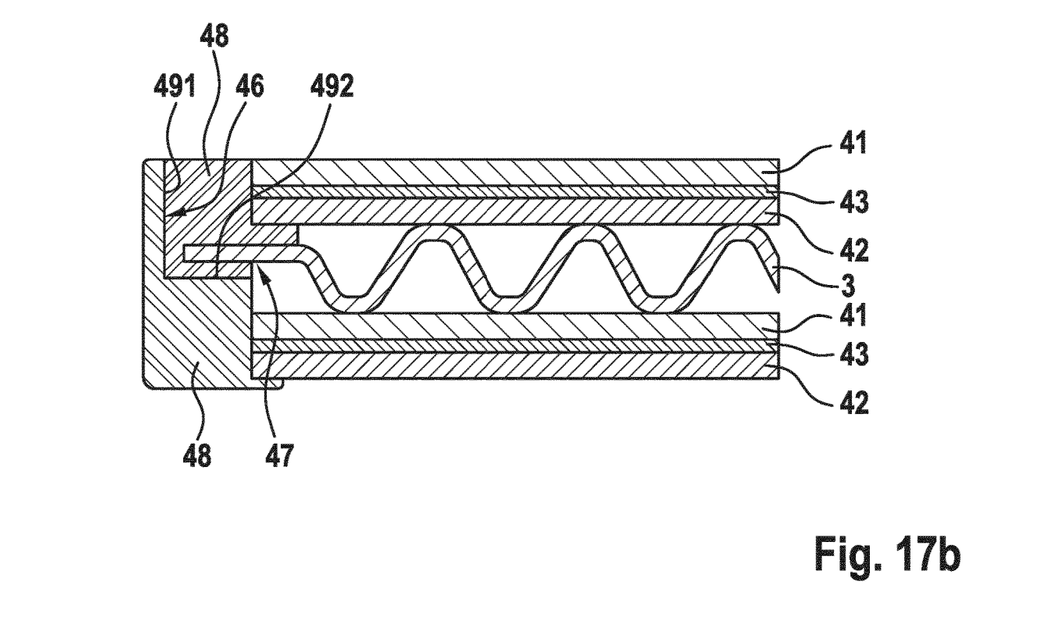

FIGS. 17a and 17b show further possibilities for the design of the receiving elements 46, 47, using the frame element 48. The frame element 48 does here not have to be designed to extend all the way round, but can also be located only on individual marginal sides 44, 45.

FIG. 17a shows the design of the upper and of the lower receiving element 46, 47, respectively in angular form with an inwardly directed side face 491 and a bearing surface 492. The side face 491 is angled off, preferably by 90°, from the bearing surface 492, so that the angular shape is produced.

Bearing/resting against the side face 491 and the bearing surface 492 of the upper receiving element 46 of the lower stacking unit 2 is the top-disposed stacking unit 2. Bearing/resting against the side face 491 and the bearing surface 492 of the lower receiving element 47 of the upper stacking unit 2 is the flow plate 3 of the same stacking unit 2.

Furthermore, FIG. 17a shows that the stacking unit 2 in the frame element 48 preferably has an upwardly open connecting groove 482 and a downwardly extending extension 481. In the stacked state, the extension 481 of the one stacking unit 2 is in the upwardly open connecting groove 482 of the other stacking unit 2.

FIG. 17b shows the angular design of the upper receiving element 46 with the side face 491 and the bearing surface 492. In the angle, formed by the side face 491 and the bearing surface 492, lies the frame element 48 of the top-disposed stacking unit 2.

In the upper stacking unit 2 in FIG. 17b, the lower receiving element 47 is formed by an inwardly open groove in the frame element 48.

FIGS. 17a and 17b show in part the design of the receiving elements 46, 47 in angular form, instead of as grooves. This design can be realized not only in connection with the shown frame elements 48, but also by shaping of the top layer 41 or bottom layer 42 according to FIGS. 1 to 10.

REFERENCE CHARACTERS 1 membrane humidifier
2 stacking unit
3 flow plate
31 corrugated profile
32 margin regions
33 sealing margins
34 flow channels
4 diffusion unit
41 top layer, in particular upper diffusion layer
42 bottom layer, in particular lower diffusion layer
43 membrane
44 first marginal sides
45 second marginal sides
46 upper receiving element
47 lower receiving element
48 frame element
481 extension
482 connecting groove
491 side face
492 bearing surface
5 bead
6 recess The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A membrane humidifier for a fuel cell system, comprising:
 a plurality of stacking units placed one on top of another;
 wherein each of the plurality of stacking units comprises a flow plate and a diffusion unit;
 wherein a periphery of the diffusion unit is formed by two opposing first marginal sides and two opposing second marginal sides;
 wherein the diffusion unit comprises:
  a top layer on a top side of the diffusion unit;
  a bottom layer on a bottom side of the diffusion unit;
  a moisture-permeable membrane in the top layer, in the bottom layer, or between the top layer and the bottom layer;
  two opposing upper receiving elements on the two first marginal sides on the top side of the diffusion unit, respectively; and
  two opposing lower receiving elements on the two second marginal sides on the bottom side of the diffusion unit, respectively;
 wherein the flow plate of the stacking unit is inserted in the two lower receiving elements; and
 wherein in the two upper receiving elements is inserted a next above-disposed stacking unit of the plurality of stacking units.

2. The membrane humidifier as claimed in claim 1, wherein at least one of the two upper receiving elements is an upper groove.

3. The membrane humidifier as claimed in claim 2, wherein the upper groove is formed by a folded-over margin of the bottom layer.

4. The membrane humidifier as claimed in claim 2, wherein the upper groove embraces the next above-disposed stacking unit.

5. The membrane humidifier as claimed in claim 1, wherein at least one of the two lower receiving elements is a lower groove.

6. The membrane humidifier as claimed in claim 5, wherein the lower groove is formed by a folded-over margin of the top layer.

7. The membrane humidifier as claimed in claim 5, wherein the lower groove embraces the respective flow plate of the stacking unit.

8. The membrane humidifier as claimed in claim 1, wherein the top layer and/or the bottom layer comprises a diffusion layer of thermoplastic nonwoven fabric.

9. The membrane humidifier as claimed in claim 1, wherein at least one of the two upper receiving elements is angular and has a side face and a bearing surface angled-off from the side face.

10. The membrane humidifier as claimed in claim 1, wherein at least one of the two lower receiving elements is angular and has a side face and a bearing surface angled-off from the side face.

11. The membrane humidifier as claimed in claim 1, wherein at least one of the two upper receiving elements and/or the two lower receiving elements is formed by a frame element which is joined respectively to the top layer or the bottom layer.

12. The membrane humidifier as claimed in claim 1, wherein a frame element extends fully over all four marginal sides and forms both the two upper receiving elements and both the two lower receiving elements of the stacking unit.

13. The membrane humidifier as claimed in claim 1, wherein the two upper receiving elements and/or the two lower receiving elements extend over an entire length of the respective two first marginal sides and the respective two second marginal sides.

14. A fuel cell system, comprising:
 a fuel cell; and
 the membrane humidifier as claimed in claim 1, wherein the membrane humidifier humidifies a cathode feed air of the fuel cell with a cathode exhaust air of the fuel cell.

15. A method for producing a membrane humidifier, comprising the steps of:
 assembling a diffusion unit from a top layer, a bottom layer, and a moisture-permeable membrane arranged in the top layer, the bottom layer, or between the top layer and the bottom layer, wherein a periphery of the diffusion unit is formed by two opposing first marginal sides and two opposing second marginal sides;
 configuring two opposing upper receiving elements on the two first marginal sides on a top side of the diffusion unit before and/or during and/or after the assembling;

configuring two opposing lower receiving elements on the two second marginal sides on a bottom side of the diffusion unit before and/or during and/or after the assembling;

forming of a stacking unit by insertion of a flow plate into the two lower receiving elements of the diffusion unit; and placing of a plurality of stacking units one on top of another, wherein into the two upper receiving elements of the stacking unit is inserted the next above-disposed stacking unit.

\* \* \* \* \*